US006990398B2

(12) United States Patent
Kinugawa

(10) Patent No.: US 6,990,398 B2
(45) Date of Patent: Jan. 24, 2006

(54) SYSTEM FOR CONTROLLING OPERATING INFORMATION OF CONSTRUCTION MACHINE AND CONSTRUCTION MACHINE THEREFOR

(75) Inventor: Hideki Kinugawa, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 137 days.

(21) Appl. No.: 09/961,112

(22) Filed: Sep. 24, 2001

(65) Prior Publication Data

US 2002/0038172 A1 Mar. 28, 2002

(30) Foreign Application Priority Data

Sep. 25, 2000 (JP) ....................................... 2000-290960
Feb. 20, 2001 (JP) ....................................... 2001-042878

(51) Int. Cl.
*G06F 7/00* (2006.01)
*G06G 7/76* (2006.01)

(52) U.S. Cl. ........................... 701/50; 701/29; 702/184; 702/188; 340/933; 340/991; 340/825.36; 455/3.03; 455/404.2; 455/412.2; 455/426.2; 455/440

(58) Field of Classification Search ............. 701/33–35, 701/1, 50, 29; 702/182–188, 150; 340/825.36, 340/942–943, 988, 991–993, 3.1–3.32, 10.1–10.4, 340/928, 933, 935, 938, 901, 903, 435–436, 340/438, 439; 235/384–385; 705/7–9, 1, 705/4, 13; 455/3.01–3.03, 404.1–404, 409, 455/412.2, 412.1, 421, 423, 426.1, 426.2, 455/440, 452.1, 452.2, 456.1, 456.5, 456.6; 367/99, 105; 700/32

See application file for complete search history.

(56) References Cited

U.S. PATENT DOCUMENTS 4,005,392 A * 1/1977 Akatsuka et al. ............. 700/32
5,058,044 A * 10/1991 Stewart et al. .............. 702/184

(Continued)

FOREIGN PATENT DOCUMENTS

EP 0249487 12/1987
EP 0725377 8/1996

(Continued)

OTHER PUBLICATIONS

Patent Abstracts of Japan, vol. 2000, No. 05, Sep. 14, 2000.

*Primary Examiner*—Jacques H. Louis-Jacques
(74) *Attorney, Agent, or Firm*—Oblon, Spivak, McClelland, Maier & Neustadt, P.C.

(57) ABSTRACT

The present invention provides an operating information control system of a construction machine comprising: operating information collection device for collecting operating information regarding operation of a construction machine; storage device for storing the operating information; and transmission controller for transmitting the operating information read from the storage device to a first receiving device provided except the construction machine through a wireless radio, the transmission controller capable of transmitting the operating information to the first receiving device when receiving a transmission request from outside of the construction machine, or continuously for a predetermined period. Thereby, since the operating information of the construction machine is transmitted making use of a low power wireless radio without using a communication satellite or a public circuit network, lots of communication cost can be reduced.

12 Claims, 7 Drawing Sheets

U.S. PATENT DOCUMENTS

| | | | | |
|---|---|---|---|---|
| 5,400,018 | A | * | 3/1995 | Scholl et al. .............. 340/10.3 |
| 5,432,508 | A | * | 7/1995 | Jackson ................... 340/932.2 |
| 5,442,553 | A | | 8/1995 | Parrillo ....................... 455/420 |
| 5,446,672 | A | * | 8/1995 | Boldys ....................... 700/174 |
| 5,635,693 | A | * | 6/1997 | Benson et al. ........... 340/10.33 |
| 5,659,470 | A | | 8/1997 | Goska et al. ................. 701/35 |
| 5,714,946 | A | | 2/1998 | Gottshall et al. ...... 340/870.16 |
| 5,870,029 | A | * | 2/1999 | Otto et al. ............. 340/825.36 |
| 5,922,037 | A | * | 7/1999 | Potts .......................... 701/29 |
| 6,006,148 | A | * | 12/1999 | Strong ........................ 701/33 |
| 6,064,299 | A | * | 5/2000 | Lesesky et al. ............. 340/431 |
| 6,112,139 | A | * | 8/2000 | Schubert et al. ............... 701/2 |
| 6,141,629 | A | * | 10/2000 | Yamamoto et al. ......... 702/187 |
| 6,195,020 | B1 | * | 2/2001 | Brodeur et al. ................ 3/125 |
| 6,226,572 | B1 | * | 5/2001 | Tojima et al. ................ 701/23 |
| 6,256,594 | B1 | * | 7/2001 | Yamamoto et al. ......... 702/185 |
| 6,349,252 | B1 | * | 2/2002 | Imanishi et al. .............. 701/50 |
| 6,408,232 | B1 | * | 6/2002 | Cannon et al. ............... 701/29 |
| RE37,822 | E | * | 8/2002 | Anthonyson ................... 701/1 |
| 6,437,688 | B1 | * | 8/2002 | Kobayashi .................. 340/435 |
| 6,604,038 | B1 | * | 8/2003 | Lesesky et al. ............... 701/49 |
| 6,696,981 | B1 | * | 2/2004 | Hashimoto .................. 340/988 |
| 2001/0037298 | A1 | * | 11/2001 | Ehrman et al. ............... 705/40 |
| 2002/0165645 | A1 | * | 11/2002 | Kageyama ..................... 701/1 |
| 2002/0184062 | A1 | * | 12/2002 | Diaz ............................ 705/7 |
| 2004/0039527 | A1 | * | 2/2004 | McDonald et al. ......... 701/213 |

FOREIGN PATENT DOCUMENTS

| | | | | |
|---|---|---|---|---|
| EP | 0989525 | | | 3/2000 |
| JP | 6-330539 | | | 11/1994 |
| JP | 7-273714 | | | 10/1995 |
| JP | 8-144312 | | | 6/1996 |
| JP | 10140616 | A | * | 5/1998 |
| JP | 10168946 | A | * | 6/1998 |
| JP | 10171523 | A | * | 6/1998 |
| JP | 10183690 | A | * | 7/1998 |
| JP | 10280486 | A | * | 10/1998 |
| JP | 11-242778 | | | 9/1999 |
| JP | 20000055791 | | | 2/2000 |
| JP | 2000-293794 | | | 10/2000 |
| JP | 2000-293795 | | | 10/2000 |
| WO | WO 90/12366 | | | 10/1990 |

* cited by examiner

FIG. 3

24

| TYPE (24a) | MACHINE NO. (24b) | OPERATING DATA (24c) | INCOMING/OUTCOMING DATA (24d) | STOCK (24e) |
|---|---|---|---|---|
| SK60SR | 012453 | FILE A1 | FILE B1 | ○ |
| SK60SR | 012454 | FILE A2 | FILE B2 | × |
| . | . | . | . | . |
| . | . | . | . | . |
| SK75UR | 022412 | FILE A16 | FILE B16 | × |
| SK75UR | 022413 | FILE A17 | FILE B17 | × |
| . | . | . | . | . |
| . | . | . | . | . |
| SK115SR | 017843 | FILE A27 | FILE B27 | ○ |
| SK115SR | 017844 | FILE A28 | FILE B28 | ○ |
| . | . | . | . | . |
| . | . | . | . | . |
| SK135SR | 015732 | FILE A36 | FILE B36 | × |
| SK135SR | 015733 | FILE A37 | FILE B37 | ○ |
| . | . | . | . | . |
| . | . | . | . | . |

FIG. 4

MAY 22, 1998

$24C_1$

| | ENGINE START | | ENGINE STOP | OPERATING TIME |
|---|---|---|---|---|
| OPERATION 1 | 9:30 | ~ | 11:40 | 2:10 |
| OPERATION 2 | 12:50 | ~ | 15:20 | 2:30 |
| OPERATION 3 | 16:00 | ~ | 16:50 | 0:50 |
| TOTAL OPERATING TIME | | | | 5:30 |

$24C_2$

| | HOUR METER (TIME) |
|---|---|
| AT ENGINE INITIAL START | 180 |
| AT ENGINE FINAL STOP | 185 |
| FUEL RESIDUAL QUANTITY | 76% |
| OPERATING TIME | 4:20 |

$24C_3$

MAY 23, 1998

| | ENGINE START | | ENGINE STOP | OPERATING TIME |
|---|---|---|---|---|
| OPERATION 1 | 8:00 | ~ | 9:30 | 1:30 |
| OPERATION 2 | 9:50 | ~ | 10:20 | 0:30 |
| OPERATION 3 | 11:40 | ~ | 12:10 | 0:30 |
| OPERATION 4 | 13:10 | ~ | 14:50 | 1:40 |
| OPERATION 5 | 15:40 | ~ | 17:30 | 1:50 |
| TOTAL OPERATING TIME | | | | 6:00 |

| | HOUR METER (TIME) |
|---|---|
| AT ENGINE INITIAL START | 185 |
| AT ENGINE FINAL STOP | 189 |
| FUEL RESIDUAL QUANTITY | 52% |
| OPERATING TIME | 2:50 |

MAY 24, 1998

| | ENGINE START | | ENGINE STOP | OPERATING TIME |
|---|---|---|---|---|
| OPERATION 1 | 9:50 | ~ | 10:00 | 0:10 |
| TOTAL OPERATING TIME | | | | 0:10 |

| | HOUR METER (TIME) |
|---|---|
| AT ENGINE INITIAL START | 189 |
| AT ENGINE FINAL STOP | 189 |
| FUEL RESIDUAL QUANTITY | 51% |
| OPERATING TIME | 0:00 |

FIG. 5

FILE B1

| | YEAR, MONTH, DAY, TIME, MINUTE | YEAR, MONTH, DAY, TIME, MINUTE | YEAR, MONTH, DAY, TIME, MINUTE | YEAR, MONTH, DAY, TIME, MINUTE |
|---|---|---|---|---|
| OUTGOING DATE AND TIME | 00.5.1.8.12 | 00.5.11.8.44 | · | · |
| INGOING DATE AND TIME | 00.5.7.17.15 | 00.5.14.18.21 | · | · |

SYSTEM FOR CONTROLLING OPERATING INFORMATION OF CONSTRUCTION MACHINE AND CONSTRUCTION MACHINE THEREFOR

BACKGROUND OF THE INVENTION

1. Field of the Invention

The present invention relates to an operating information control system of a construction machine and a construction machine therefore.

2. Description of the Related Art

Conventionally, with respect to the rental of a construction machine such as a hydraulic excavator, it is general that the rental fee is calculated on the basis of an actual using period instead of a lending period of a construction machine. More specifically, operating information such as engine start/stop time, operating time, and fuel residual quantity are once stored in a memory such as an IC card set in a construction machine, and a rental company reads the operating information after completion of lending to calculate the rental fee.

However, in the above method for controlling operating information by the IC card, accurate operating information cannot be obtained unless the IC card is set in a construction machine at the start of work. Further, in a case where operating information is read, it is necessary to take the IC card to the rental company to put the operating information into a host computer of the rental company through a readout device. Therefore, in the rental company having many machines, the reading process is cumbersome.

In view of the foregoing, it has been proposed an operating information control system capable of transmitting the operating information to the rental company through a communication satellite to control the received information at a real time.

However, since in this system, operating information is transmitted making use of a satellite communication, a costly communication fee occurs. In a case that making use of a satellite communication costs about 5,000 yen/month per machine, when the rental company having, for example, 1,000 construction machines intends to perform this sort of operating control, the communication fee of sixty million yen per year occurs. Such an expensive communication fee as described is the heavy burden on the management of the company, thus posing a problem that this system is short in practicability.

SUMMARY OF THE INVENTION

It is an object of the present invention to provide an operating information control system of a construction machine and a construction machine therefore capable of performing reading of operating information simply without requiring an expensive communication cost in controlling operation of the construction machine.

The operating information control system of a construction machine according to the present invention has the following constitution:

operating information collection means for collecting operating information regarding operation of a construction machine; storage means for storing the operating information; and transmission controller for transmitting the operating information read from the storage means to a first receiving device provided except the construction machine through a wireless radio. The transmission controller transmits operating information when a transmission request is received from outside of the construction machine, or transmits the operating information continuously for a predetermined period of time to the first receiving device. For example, operating information transmitted is received by the first receiving device within the transmission permissible range of the wireless radio. Thereby, operating information can be read from the construction machine. In a case where the receiving device is provided in a base station for controlling the construction machine, the construction machine is returned to the base station whereby the receiving device enters a transmission permissible area. At that time, the operating information can be transmitted and received between the transmission controller and the receiving device. More specifically, when the construction machine passes through a gate of the base station, the operating information can be received from the construction machine.

In this case, the operating information of the construction machine is transmitted making use of a small-power wireless ratio without using a communication satellite or a public circuit network, and therefore, the communication cost can be reduced. Moreover, as a medium for reading the operating information from the construction machine, a wireless communication is utilized though its transmission area is limited, and therefore, reading of the operating information can be processed in a short period of time without requiring a manual work.

BRIEF DESCRIPTION OF THE DRAWINGS

FIG. 3 is a schematic view showing the control form of operating information according to one embodiment of the present invention;

FIG. 4 is a schematic view showing the stored content of operating data shown in FIG. 3;

FIG. 5 is a schematic view showing the stored content of in/out data shown in FIG. 3;

DESCRIPTION OF THE PREFERRED EMBODIMENT

Figure 1:
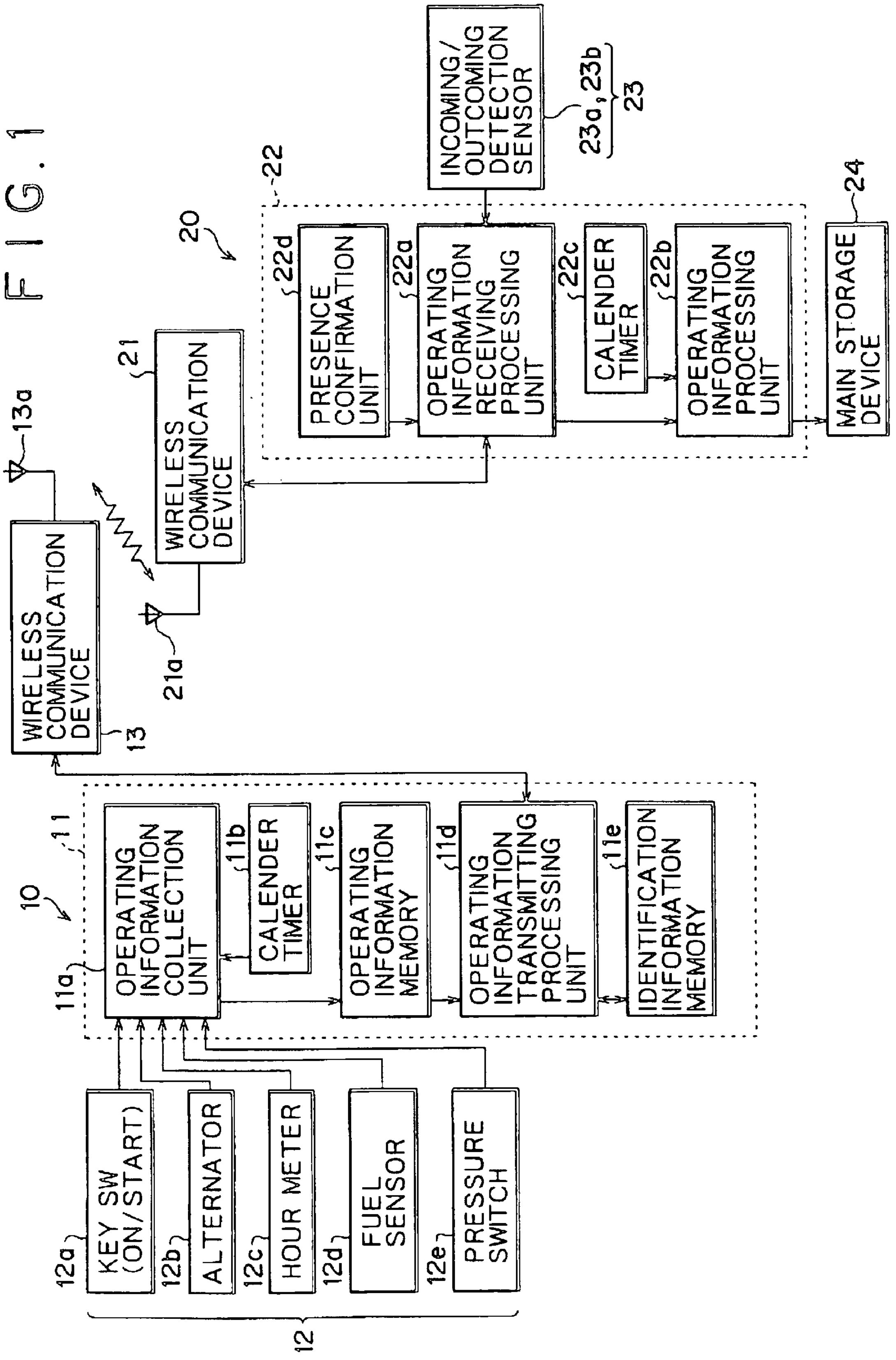
FIG. 1 is a block diagram showing the constitution of an operating information control system using a first embodiment of an operating information reading device according to the present invention.

The present invention will be explained hereinafter with reference to the embodiments shown in the drawings. This is merely one embodiment, and the invention is not limited thereto.

FIGS. 1 to 6 show an operating information control system using an operating information reading device of a first embodiment.

In the figure, the operating information control system mainly comprises an operating information collection device 10 mounted on the construction machine, and an operating information control device 20 for receiving and processing operating information transmitted by wireless communication from the device 10. The operating information control device 20 is installed, for example, within a premises of a rental company as a base station having a plurality of construction machines for rent. The base station is not always required to be installed within the premises of the rental company but may be installed in any suitable place.

First, the constitution of the operating information collection device 10 will be explained. The collection device 10 has a controller 11 for processing operating information collected from the construction machine. A group of sensors 12 for the collecting operating information is connected to the controller 11.

In the group of sensors 12, when a start key is inserted into a key switch 12*a* to switch a position from "LOCK" position through a power supply "ON" to "START" position, a starting motor rotates to drive an engine (not shown). At the start time and stop time of the engine, an engine start signal and an engine stop signal are sent to an operating information collection unit 11*a* of the controller 11, respectively.

Further, simultaneously with the start of the engine, detection signals output from an alternator 12*b*; an hour meter 12*c*, a fuel sensor 12*d* and a pressure switch 12*e* are also sent as operating information to the operating information collection unit (operating information collection means) 11*a*. The operating information collection unit 11*a* corresponds the operating information to date and time information output from a calendar timer 11*b* to store them in an operating information memory (storage means) 11*c*.

An operating information transmission processing unit (transmission control means) 11*d* reads, when received a transmission request signal from an operating information control device 20 described later, operating information OD stored temporarily in the operating information memory 11*c*. Subsequently, type information and machine number information MD of the construction machine read out of an identification information memory 11*e* are added to the operating information OD to transmit them from an antenna 13*a* of a wireless communication device 13.

Figure 2:
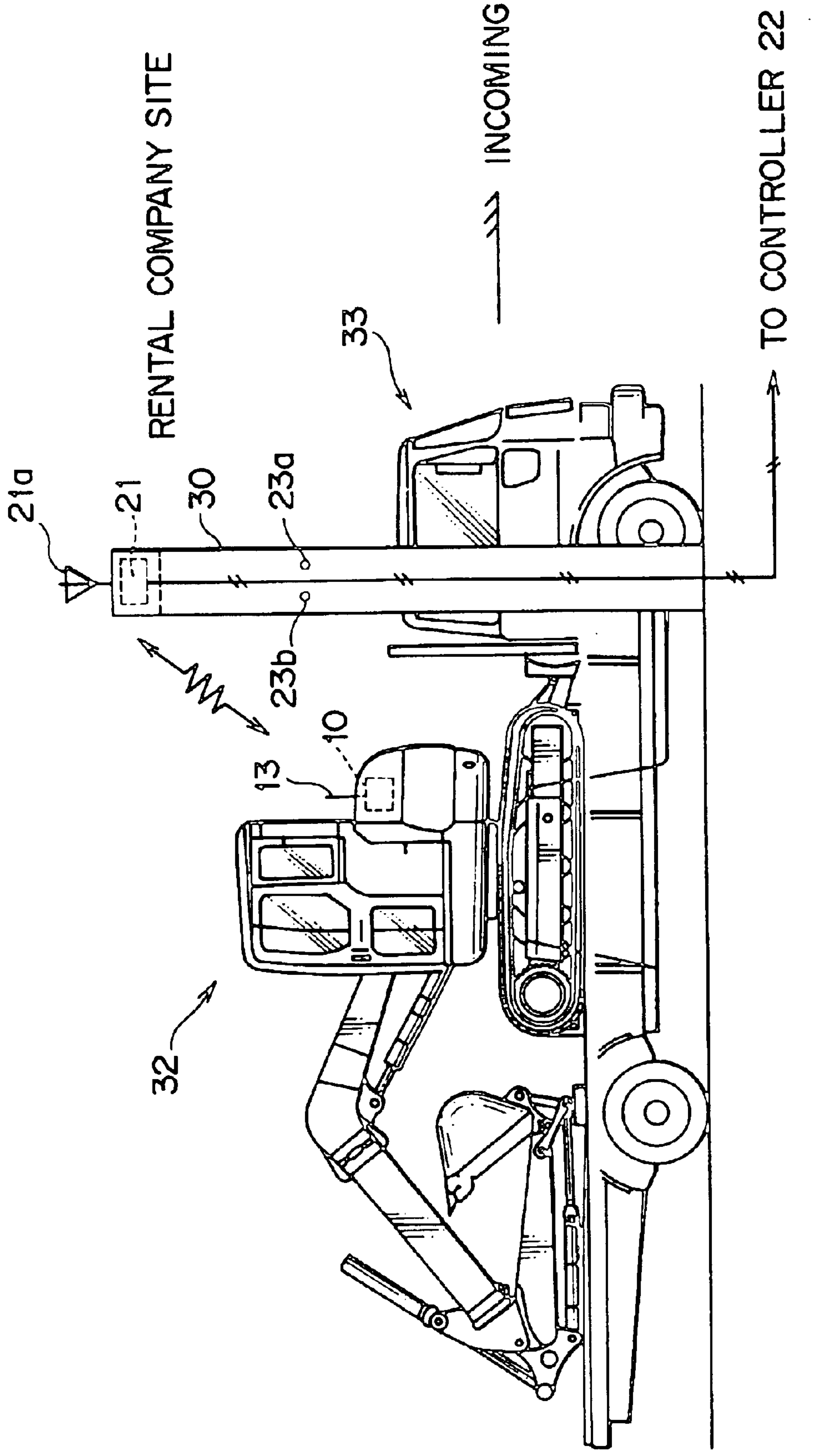
FIG. 2 is a schematic view showing the state that operating information is wireless communicated according to one embodiment of the present invention.

On the other hand, in the rental company, a wireless communication device 21 connected to the operating information control device 20 is provided at a gate 30 through which a construction machine passes at an incoming time or at an outgoing time (see FIG. 2). Operating information transmitted from the construction machine is received through an antenna 21*a* and processed by a controller 22. The wireless communication devices 13, 21 can be constituted, for example, by simplified wireless devices of 2.4 GHz band.

To a controller 22 is connected a pair of incoming/outgoing sensors (incoming/outgoing detector) 23*a*, 23*b*. These sensors 23*a*, 23*b* are arranged on the gate 30 along a passing direction of a construction machine 32. Accordingly, at the outgoing time, detection signals are output in the order of from the first sensor 23*a* to the second sensor 23*b*. Conversely, at the incoming time, detection signals are output in the order of from the second sensor 23*b* to the first sensor 23*a*. That is, the incoming or the outgoing of the construction machine 32 is specified on the basis of the order of signals output from the sensors. These sensors 23*a*, 23*b* will be sometimes referred to an incoming/outgoing detection sensor 23 in blanket hereinafter.

With the detection signals output from the sensors 23*a*, 23*b* as a trigger, the operating information reception processing unit 22*a* transmits a transmission request of operating information to the operating information transmission processing unit 11*d* of the construction machine 32.

The processing unit 11*d* having received the transmission request reads the operating information OD from the operating information memory 11*c*, reads identification information MD (type information, machine number information) of the construction machine 32 which intends to pass through the gate 30 from the identification information memory 11*e*, and transmits both information OD+MD to the operating information control device 20.

The processing unit 22*a* sends the received both information OD+MD to an operating information processing unit 22*b*. The processing unit 22*b* performs processing of the operating information, and stores, when the processing is completed, it in a main memory device or a main storage device (operating information storage means) 24 of a host computer connected by way of wire. Reference numeral 22*c* designates a calendar timer, which sends date and time of incoming or outgoing of the construction machine to the processing unit 22*b*. The wireless communication device 21 and the operating information reception processing unit 22*a* function as a receiving device.

FIG. 3 shows contents of operating information processed by the processing unit 22*b* and stored in the main storage device 24.

The main storage device 24 is equipped with a type column 24*a* for storing data showing the type of construction machines, a machine number column 24*b* for storing machine number data showing what number a machine has, an operating data column 24*c* for storing operating data, an incoming/outgoing data column 24*d* for storing incoming/outgoing data, and a stock column 24*e* for storing data indicative of presence of machine stock. Data processed by the operating information processing unit 22*b* is classified and stored in each of the column.

For example, a description will be made of machine No. "012453" of the type "SK60SR". Operating data is stored in an exclusive-use file A1, and incoming/outgoing data is stored in a file B1.

FIG. 4 shows storage contents of the file A1. In the file A1 is stored the time when the engine of the construction machine of the type "SK60SR" starts or stops along the lapse of time (operation 1, operation 2, operation 3) every work day. The total operating time calculated by the operating information processing unit 22*b* is also stored (see 24$C_1$).

As for data collected from the hour meter 12*c*, accumulated time from the engine initial start to the engine last (final) stop is stored (see 24$C_2$).

The fuel residual quantity is calculated on the basis of fuel data collected from a fuel sensor 12*d* and is stored while corresponding to actual operating time of the construction machine (see 24$C_3$).

In the stock column 24*e* is stored data showing if the construction machine 32 is present in the premises of the rental company. A presence confirmation unit (confirmation means) 22*d* of the operating information control device 20 periodically transmits a request signal for confirming the presence to the construction machine 32. In a case where a response of a presence confirmation response signal is received from the operating information collection device 10, data "○" is stored in the stock column 24*e*. In a case where no response of a presence confirmation signal is present, data "X" is stored. Alternatively, the presence or absence may be stored by raising or lowering a flag (flag mark).

On the other hand, FIG. 5 shows storage contents of the file B1. In the file B1 are stored outgoing date and time and incoming date and time of the construction machine each other correspondingly.

Each information shown in FIGS. 3 to 5 are converted into visible data and displayed on a monitor screen of the rental company.

If constitution is employed such that date and time of communication made between the construction machine and the base station is sent as incoming or outgoing date and time information to the operating information control means, incoming/outgoing control of the construction machine becomes enabled.

When the rental period ends, the construction machine 32 is placed on a loading space of a carrying vehicle 33 and returned to the rental company as shown in FIG. 2 for the purpose of checking the breakage of the body or washing the machine. At that time, the construction machine 32 passes through the gate 30.

At that time, the wireless communication device 13 of the operating information collection device 10 and the wireless communication device 21 provided at the gate 30 come close each other and enter a mutual communication area. Therefore, wireless communication can be done by a simplified wireless radio which is short in arriving distance of radio wave and is narrow in communication area.

Further, according to this invention, a low output of a low power wireless radio will suffice, and interference with other radio waves can be also cleared up.

If, when passing through the gate of the base station, a transmission request of operating information is issued to the construction machine, the operating information is automatically read when the construction machine passes through the gate on incoming or outgoing.

If transmission of the operating information is carried out only when incoming or outgoing of the construction machine is detected, consuming power of the low power wireless radio can be further reduced to save energy.

According to the present invention, the operating information is read at the predetermined place by making use of the fact that the construction machine passes through the gate at the time of incoming or outgoing, and therefore, the operating information can be read without fail.

Figure 6:
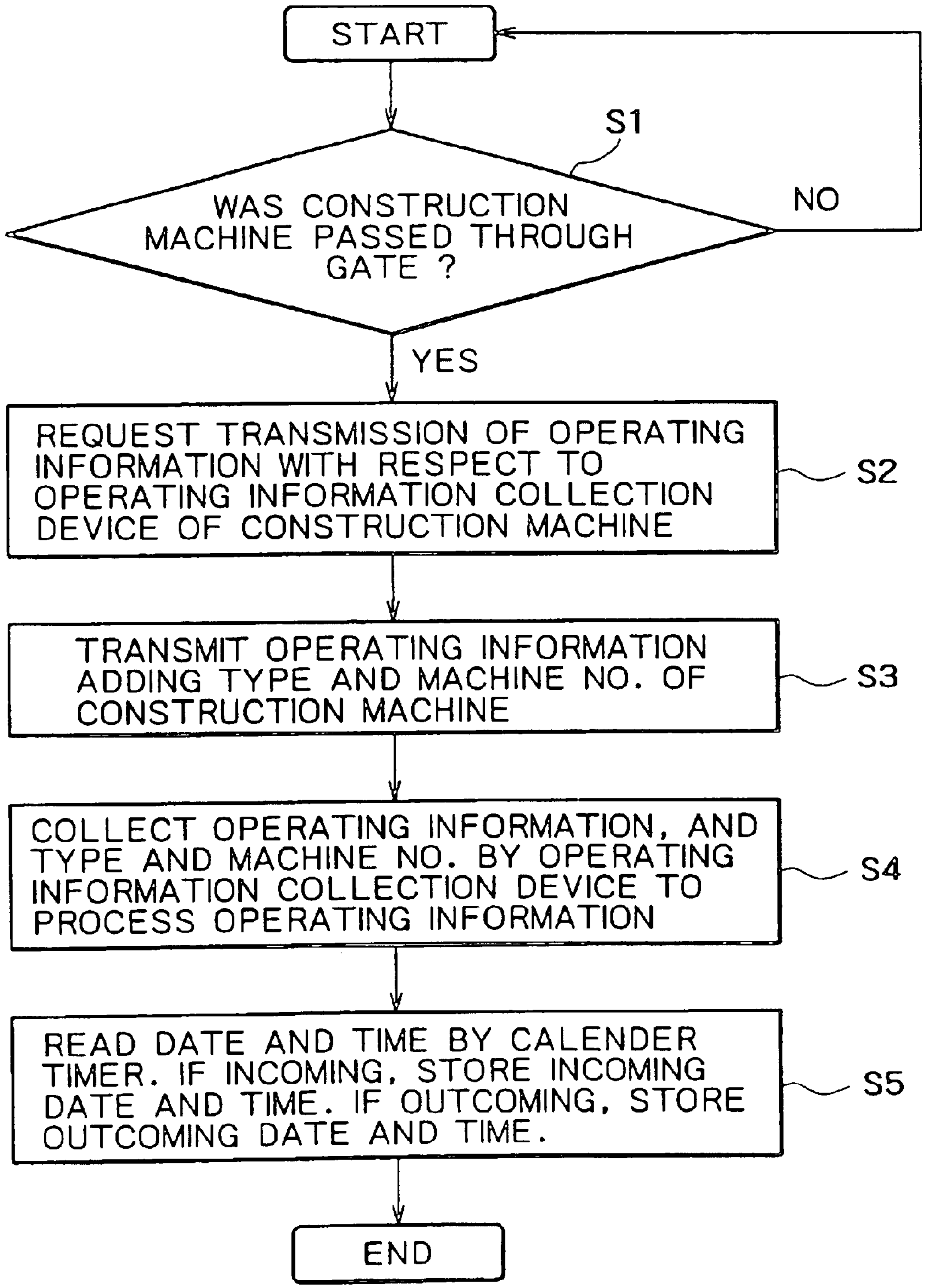
FIG. 6 is a flow chart for explaining control operation of an operating information control system using according to one embodiment of the present invention.

The control operation of the operating information control system having the above-described constitution will be described hereinafter with reference to FIG. 6.

First, the operating information reception processing unit 22*a* monitors an incoming/outgoing signal output from the incoming/outgoing detection sensor 23 to thereby judge if the construction machine 32 has passed through the gate 30 (Step S1).

When the passage of the construction machine 32 is detected, the operating information reception processing unit 22*a* requests the operating information collection device 10 of the construction machine 32 to transmit the operating information (Step S2).

The operating information collection device 10 having received a transmission request reads the operating information OD from the operating information memory 11*c*, and reads the identification information MD indicative of the type and the machine number of the construction machine 32 having passed through the gate from the identification information memory 11*e*. Subsequently, both the information OD+MD are transmitted to the operating information control device 20 through the wireless communication devices 13 and 21 (Step S3).

The control device 20 having received both the information OD+MD processes them into the forms shown in FIGS. 3 and 4 by the operating information processing unit 22*b* (Step S4).

Subsequently, the operating information processing unit 22*b* reads date and time information from the calendar timer 22*c*. As shown in FIG. 5, in case of incoming, incoming date and time is stored, and in case of outgoing, outgoing date and time is stored (Step S5).

At the outgoing time, operating information such as the engine start, and the engine stop are not stored in the operating information storage unit 11*c*. In this case, the operating information transmission unit 11*d* outputs no information.

The wireless communication carried out between the construction machine and the control computer in the present invention is constituted by a simplified wireless machine of a specific frequency band in the above-described embodiment. However, a feeble wireless device or a low power wireless device can be also used not limiting thereto.

Accordingly, according to the present invention, it is possible to transmit operating information of the construction machine making use of a low power wireless device (including a feeble wireless device and a simplified wireless device making use of a specific frequency band) without using a communication satellite or a public circuit network. Therefore, no communication cost is required, and in addition, since a wireless communication is used as a medium, reading of operating information can be processed in a short time without requiring a manual work.

Further, in the above-described embodiment, a description has been made of a case where the base station is provided in the premises of the rental company. However, it can be provided in a place away from the rental company, for example, a car washing area or a warehouse not limiting thereto.

Further, in the above-described embodiment, a receiving device for receiving operating information and an operating information control device for controlling operating information are provided on one base station. However, the devices may be arranged in separate base stations respectively. For example, the receiving devices are located to be scattered in business offices or parking lots, and the received operating information may be transmitted to a control computer as an operating information control device provided in the head office through the Internet or the like. Further, it is acceptable that construction machine makers owns operating information control devices whereas receiving devices are installed in rental companies, and the construction machine makers executes the operating information control for the rental companies. In this case, a plurality of base stations exist.

Figure 7:
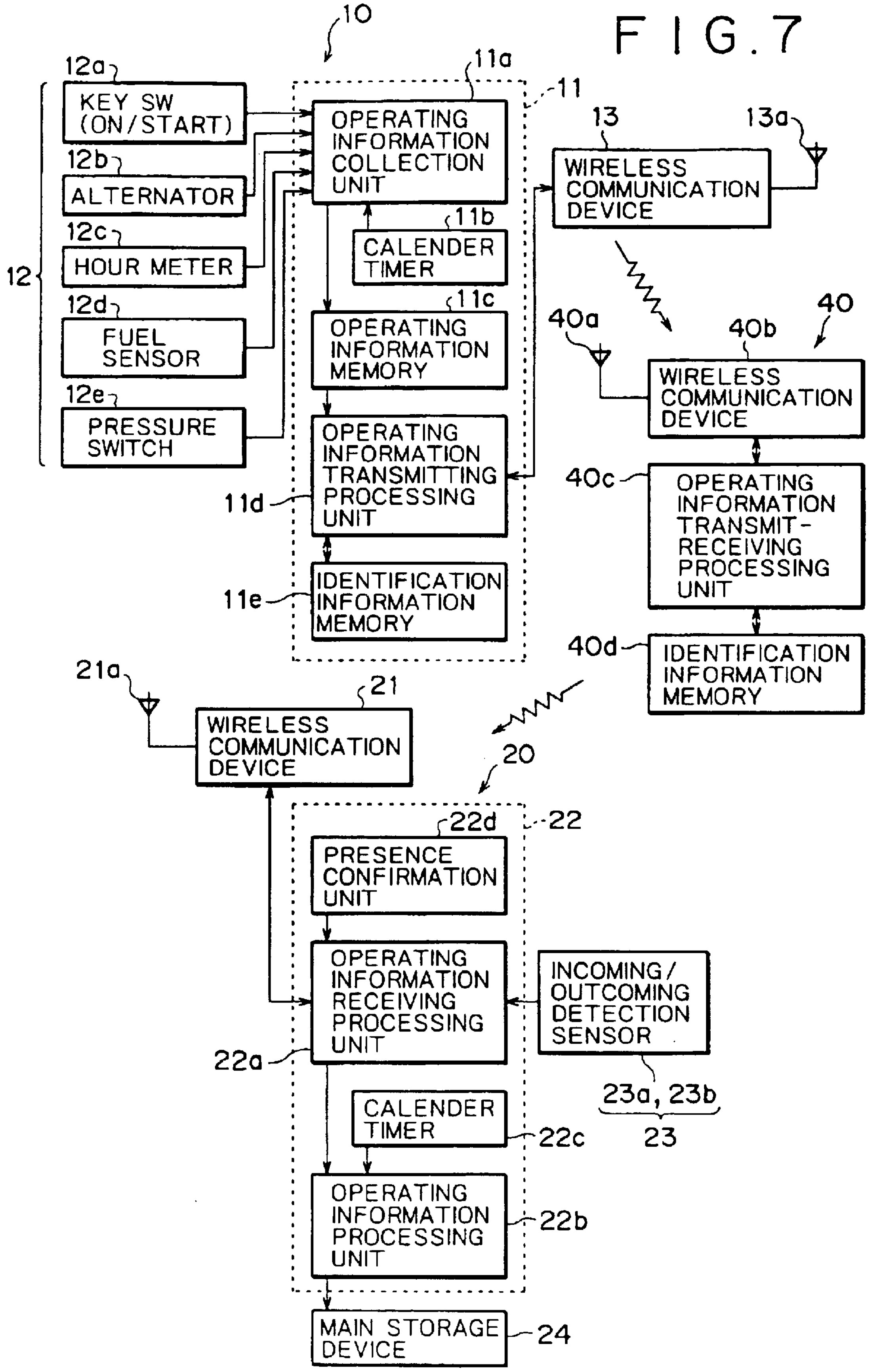
FIG. 7 is a block diagram showing the constitution of an operating information control system using a second embodiment of an operating information reading device according to the present invention.

FIG. 7 shows the constitution of an operating information control system using an operating information reading device according to a second embodiment of this invention. In the figure, the same constituent elements as those of FIG. 1 are indicated by the same reference numerals, explanation of which are omitted.

In the figure, numeral 40 shows the constitution of a portable wireless radio, which comprises a wireless communication device 40*b* connected to an antenna 40*a*, an operating information transmit-receive processing unit 40*c* for receiving and transmitting operating information through the communication device 40*b*, and an operating information memory 40*d* for storing the received operating information. The portable wireless radio 40 is mounted, for example, on an automobile (a movable body) not shown driven by a staff member or a mechanic of a rental company having construction machines. The wireless communication device 40*b* and the operating information transmit-receive processing unit 40*c* function as a second receiving device. In this respect, the receiving device according to the first embodiment described above is positioned to be the first receiving device.

The staff member drives the above-described automobile to visit the sites for which construction machines are lent out. Or he travels on the road near the cites. When the automobile enters the transmission area of a wireless communication device 13 of the construction machine, a power supply of the portable wireless radio 40 is turned ON. Then, the operating information transmit-receive processing unit 40*c* performs a transmission request of operating information from the wireless communication device 40*b* in accordance with a predetermined program.

The operating information transmit-receive processing unit (second transmission control means) 11*d* having received the transmission request through the wireless communication device 13 reads the operating information OD from the operating information memory (storage means) 11*c*, reads own identification information MD (type information, machine number information) from the identification information memory 11*e*, and transmits both the information OD+MD to the portable wireless radio 40.

Subsequently, when the transmission of the operating information is completed, the operating information collection unit 11*a* clears the operating information memory 11*c*, and stands by for collecting next operating information.

Operating information transmitted to the portable wireless radio 40 is stored in the operating information memory 40*d* by the operating information transmit-receive processing unit 40*c*.

In this manner, when the staff member moves near the site for which a construction machine is lent out by car, communication between the construction machine and the car is automatically performed within the communication area of the device 13. Operating information transmitted from the construction machines are to be stored in the operating information memory 40*d* of the portable wireless radio 40 every machine number. Accordingly, operating information can be collected merely by traveling near each of the construction machines lent out.

When the car having collected operating information returns to the base station and passes through the gate 30, the operating information receiving processing unit 22*a* performs a transmission request of operating information with respect to the portable wireless radio 40 similarly to the operating information control system according to the first embodiment. The operating information transmit-receive processing unit 40*c* having received the transmission request reads operating information from the operating information memory 40*d*, and transmits the identification information MD indicative of the type and the machine number of the construction machine having collected operating information and the operating information OD to the operating information control device 20 through the wireless communication device 40*b*.

The thereafter processes are the same as the operating information control system according to the first embodiment, but since the construction machine is not in the state of incoming or outgoing actions to their warehouse, the incoming date and time, and the outgoing date and time are not stored.

If the constitution is employed so that operating information of the construction machine can be collected prior to incoming of the construction machine, the rental plan of construction machines can be made more accurately. Further, since operating information can be controlled in the lapse of time, the maintenance plan can be made accurately.

Further, the operating information control device trially performs communication periodically with respect to the construction machine within the base station to confirm if communication is established to thereby enable further provision of confirmation means for checking the presence of construction machines.

If the transmission control means transmits operating information to the receiving device in the state that identification information peculiar to the construction machine is added, when a plurality of construction machines that should be controlled are present, it is possible to easily specify the construction machine which is transmitting operating information.

Further, communication trially performs with respect to the construction machine within the base station to confirm if communication is established to thereby enable checking the presence of the construction machine, and when a robbery of a construction machine occurs, prompt coping therewith can be made.

Further, the receiving device is carried into the transmission area of a transmit processing unit provided with the construction machine whereby even if the transmission area is narrow, operating information of the construction machine can be read by a wireless communication. Accordingly, even if the construction machine is not returned to the base station, operating information can be obtained.

The movable body is mounted, for example, on the automobile driven by the staff member or the service man, whereby the construction machine can be moved into the transmission area easily. That is, in the transmission area for a low power wireless radio, operating information can be read merely by traveling near the construction machine.

According to the present invention, operating information read by the operating information reading device is classified every construction machine by the operating information control device, and accumulated by operating information accumulation means. Accordingly, when the construction machine returns to the base station, or when the movable body having obtained operating information returns to the base station, operating information of the construction machine is updated.

From the foregoing, one embodiment of the present invention has been disclosed, but the scope of protection of the present invention is not limited thereto.

I claim:

1. A system for controlling operating information of a construction machine comprising:

operating information collection means at said construction machine for collecting operating information regarding operation of the construction machine;

a first receiving device provided in a base station for said construction machine;

storage means at said construction machine for storing the operating information;

detector means for detecting that the construction machine has left the base station and for detecting that the construction machine has returned to the base station; and a transmission controller for transmitting the operating information read from the storage means to the first receiving device through a wireless radio having a limited range, including means responsive to a signal from the detector means that the construction machine has returned to the base station for transmitting the operating information read from the storage means to the first receiving device through the wireless radio.

2. The system according to claim 1, further comprising:

an operating information control device for controlling said operating information received by said first receiving device; and operating information accumulating means provided on said operating information control device to accumulate said operating information, said operating information accumulating means classifying said operating information for plural construction machines.

3. The system according to claim 2, wherein said receiving device provides date and time at which receiving and transmitting of said operating information is carried out relative to said construction machine for said operating information control device as incoming or outgoing date and time information of said construction machine.

4. The system according to claim 2, further comprising:

confirmation means for confirming whether communication is established when said operating information control device tries to get into communication periodically with said construction machine within the base station to thereby check existence of said construction machine.

5. The system according to claim 1, further comprising:

a movable body on which is mounted a second receiving device for receiving said operating information transmitted from said transmission controller.

6. The system according to claim 1 wherein said detector means comprise sensors positioned to detect that a construction machine has left the base station and that the construction machine has returned to the base station based upon an order of signals output from the sensors.

7. A construction machine, comprising:

operating information collection means at said construction machine for collecting operating information regarding operation of the construction machine;

storage means at said construction machine for storing the operating information;

detector means for detecting that the construction machine has left the base station for the construction machine and for detecting that the construction machine has returned to the base station; and a transmission controller for transmitting the operating information read from the storage means to a first receiving device provided in the base station through a wireless radio having a limited range, including means responsive to a signal from the detector means that the construction machine has returned to the base station for transmitting the operating information read from the storage means to the first receiving device through the wireless radio.

8. The construction machine according to claim 7, wherein said transmission controller reads said operating information from said storage means to transmit it to a second receiving device when a movable body provided with said second receiving device for receiving said operating information exists in a transmissible range of said wireless radio.

9. The construction machine according to claim 7, wherein when said operating information is transmitted, identification information of said construction machine in addition to said operating information is transmitted.

10. The construction machine according to claim 7 wherein said detector means comprise sensors positioned to detect that a construction machine has left the base station and that the construction machine has returned to the base station based upon an order of signals output from the sensors.

11. A system for controlling operating information of a construction machine, comprising:

operating information collection means for collecting operating information regarding operation of a construction machine;

a first receiving device provided on a movable body external to said construction machine;

storage means for storing the operating information;

detector means for detecting that a construction machine has left the base station for said construction machine and for detecting that the construction machine has returned to the base station; and a transmission controller for transmitting the operating information read from the storage means to the first receiving device through a wireless radio having a limited range, including means responsive to a signal from the detector means that the construction machine has returned to the base station for transmitting the operating information read from the storage means to the first receiving device through the wireless radio.

12. The system according to claim 11 wherein said detector means comprise sensors positioned to detect that a construction machine has left the base station and that the construction machine has returned to the base station based upon an order of signals output from the sensors.

* * * * *